(12) United States Patent
Wei et al.

(10) Patent No.: US 12,058,094 B1
(45) Date of Patent: *Aug. 6, 2024

(54) SYSTEM AND METHOD FOR ENABLING COMMUNICATION BETWEEN NETWORKS WITH OVERLAPPING IP ADDRESS RANGES

(71) Applicant: Aviatrix Systems, Inc., Santa Clara, CA (US)

(72) Inventors: Xiaobo Sherry Wei, Palo Alto, CA (US); Pankaj Manglik, Palo Alto, CA (US); Sunil Kishen, Palo Alto, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 17/504,481

(22) Filed: Oct. 18, 2021

Related U.S. Application Data (63) Continuation of application No. 16/746,738, filed on Jan. 17, 2020, now Pat. No. 11,153,262, which is a continuation of application No. 15/201,187, filed on Jul. 1, 2016, now Pat. No. 10,541,966.

(60) Provisional application No. 62/188,341, filed on Jul. 2, 2015.

(51) Int. Cl.
| | |
|---|---|
| *H04L 12/28* | (2006.01) |
| *H04L 45/586* | (2022.01) |
| *H04L 45/745* | (2022.01) |
| *H04L 61/106* | (2022.01) |
| *H04L 61/4535* | (2022.01) |

(52) U.S. Cl.
CPC .......... *H04L 61/106* (2013.01); *H04L 45/586* (2013.01); *H04L 45/745* (2013.01); *H04L 61/4535* (2022.05)

(58) Field of Classification Search
None
See application file for complete search history.

(56) References Cited

U.S. PATENT DOCUMENTS

| | | | |
|---|---|---|---|
| 9,832,118 B1* | 11/2017 | Miller | H04L 45/74 |
| 10,541,966 B1* | 1/2020 | Wei | H04L 45/586 |
| 11,153,262 B1* | 10/2021 | Wei | H04L 45/586 |

(Continued)

*Primary Examiner* — Clemence S Han
(74) *Attorney, Agent, or Firm* — Winstead PC (57) ABSTRACT

A method is described that enables communication between two disjoined networks with overlapping IP address ranges. The method features receiving a first address mapping query message from a first intermediary device and returning a first private IP address map. The first private IP address map includes at least a first plurality of private IP addresses each uniquely assigned to a computing device residing in the first network. In response to a triggering event, recovering a second private IP address map by a second intermediary device. Herein, the second private IP address map includes at least a second plurality of private IP addresses each uniquely assigned to a computing device residing in the second network. Thereafter, the source IP address for a private IP address associated with the computing device is substituted prior to transmission of a message from the first intermediary device to the second intermediary device upon determining that the first network and the second network include overlapping private IP address ranges.

13 Claims, 4 Drawing Sheets

(56) References Cited

U.S. PATENT DOCUMENTS

| | | | | |
|---|---|---|---|---|
| 11,533,389 B2* | 12/2022 | Lambeth | ............... | H04L 49/70 |
| 2004/0073704 A1* | 4/2004 | Paunikar | ............ | H04L 61/5046 |
| | | | | 345/568 |
| 2004/0095934 A1* | 5/2004 | Cheng | ................ | H04L 45/16 |
| | | | | 370/389 |
| 2004/0249974 A1* | 12/2004 | Alkhatib | ............ | H04L 61/2503 |
| | | | | 709/245 |
| 2007/0140267 A1* | 6/2007 | Yang | ................ | H04L 61/2564 |
| | | | | 370/401 |
| 2008/0298367 A1* | 12/2008 | Furukawa | ............ | H04L 45/04 |
| | | | | 370/392 |
| 2011/0090815 A1* | 4/2011 | Gundavelli | ......... | H04L 61/2517 |
| | | | | 370/253 |
| 2011/0283017 A1* | 11/2011 | Alkhatib | ............ | H04L 12/4633 |
| | | | | 718/1 |
| 2013/0121252 A1* | 5/2013 | Peng | ................ | H04W 4/12 |
| | | | | 370/328 |
| 2013/0287026 A1* | 10/2013 | Davie | ................ | H04L 41/40 |
| | | | | 370/392 |
| 2014/0185622 A1* | 7/2014 | Yeh | ................ | H04L 45/12 |
| | | | | 370/401 |
| 2014/0219280 A1* | 8/2014 | McKinney | ........... | H04L 45/745 |
| | | | | 370/392 |
| 2015/0381493 A1* | 12/2015 | Bansal | ................ | H04L 45/741 |
| | | | | 370/392 |

* cited by examiner

SYSTEM AND METHOD FOR ENABLING COMMUNICATION BETWEEN NETWORKS WITH OVERLAPPING IP ADDRESS RANGES

CROSS REFERENCE TO RELATED APPLICATIONS

This application is a continuation of U.S. application Ser. No. 16/746,738 filed Jan. 17, 2020, now U.S. Pat. No. 11,153,262 issued Oct. 19, 2021, which is a continuation of U.S. patent application Ser. No. 15/201,187 filed Jul. 1, 2016, now U.S. Pat. No. 10,541,966 issued Jan. 21, 2020 which is based upon and claims the benefit of priority from U.S. Provisional Patent Application No. 62/188,341 filed Jul. 2, 2015, the entire contents of which are incorporated herein by reference.

FIELD

Embodiments of the disclosure relate to the field of networking. More specifically, one embodiment of the disclosure relates to an address resolution scheme for networks with overlapping Internet Protocol (IP) private address ranges.

GENERAL BACKGROUND

Over the few decades, networks have become necessary and essential mechanisms that enable individuals to communicate and share data. Internet Protocol (IP) is a communication protocol that defines how computers, smartphones and other computing devices communicate over one or more networks. These networks may include private networks and/or public networks such as the Internet. In general, an IP address is assigned to each computing device, which serves as an identifier for the computing device and ensures that data meant for a particular computing device is not accidentally routed to another computing device.

Generally, IP addresses can be assigned to computing devices in a network as a static IP address or a dynamic IP address. For static IP address assignment, once a computing device has been assigned an IP address, the IP address remains with the computing device and is not changed for different communication sessions. For a dynamic IP address assignment, however, the IP address is assigned temporarily to the computing device.

Usually, network administrative control is required to avoid IP address duplication, which could cause network disruption. In fact, disjoint or geographically separated networks require unique IP address ranges in order to communicate with each other through routing functions. However, with the emergence of cloud computing, it is becoming more common to encounter networks having identical or at least overlapping private IP address ranges, where these networks include computing devices that are attempting to communicate with each other. For instance, most public cloud providers offer a default virtual private cloud (VPC) address range for different users, and as a result, multiple networks are assigned identical address ranges. A problem arises when a computing device that is part of one network needs to communicate with a computing device that is part of another network, but the private IP address ranges for these networks are overlapping in part or in its entirety. This may occur in a situation where a computing device in a first network is running a cloud-based application and now needs to access a server in another network with identical or overlapping address ranges.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

According to one embodiment of the disclosure, Internet Protocol (IP) addressing logic is described that enables computing devices within two or more (multiple) networks supporting identical or overlapping private IP address ranges to communicate with each other through resolved private IP addresses. The IP addressing logic comprises (i) address management logic that is configured to manage a plurality of private IP addresses (hereinafter "IP address pool") and (ii) intermediary devices, each of which may be operating as an edge device within a corresponding virtual private network. The intermediary devices can communicate with the address management logic through one or more in-band or out-of-band communication channels to ensure IP private address uniqueness.

In accordance with one embodiment of the disclosure, the address management logic is accessed to resolve potential private IP address conflicts when a computing device of a first virtual private network is attempting to communicate with another computing device from a second virtual private network, which supports a private IP address range that at least partially overlaps the private IP address range of the first virtual private network.

Herein, at the time of or prior to an attempt by a first computing device operating in a first virtual (private) network to communicate to a second computing device operating in a second virtual (private) network, the first computing device may initiate an address query that includes an identifier for the second virtual private network (e.g., domain name, assigned IP address "IP-Host2", etc.). As one example, the address query may be conducted automatically and may constitute a Domain Name Server (DNS) query. In response to the address query from the first computing device, the address management logic allocates a corresponding destination IP address (IP-B) from the IP address pool that it manages and returns that IP address (IP-B) to the first computing device. The IP address range of the IP address pool is not overlapping with IP addresses associated with the first virtual network or the second virtual network. For instance, where the first virtual private network and the second virtual private network are overlapping (e.g., IP address ranges 10.0.0.0-10.1.8.0 and 10.1.0.0-10.2.8.0 respectively), the IP address range for the IP address pool supporting these virtual private networks would be a different IP address range (e.g., IP address range starting at 172.16.0.0).

Alternatively, in lieu of using an address query, the first computing device may learn that the second computing device has been assigned the second private IP address (IP-B) through out-of-band communications (e.g., posting by network administrator, email from an intended destination, etc.). As yet another alternative, in lieu of the use of out-of-band communications, the first virtual network can be scanned to discover all of the computing devices that are connected to the first virtual network. Also, the second network can be scanned to discover all of the computing devices that are connected to the second virtual network. Each computing device in the first virtual network can be automatically assigned a unique private IP address from the IP address pool by the address management logic. Each computing device in the second virtual network can be automatically assigned a unique private IP address by the address management logic.

Hence, to communicate from the first computing device to the second computing device that is one of a plurality of computing devices within the second virtual network, the first computing device sends a message (e.g., a packet) with a destination IP address of the second private IP address (IP-B) and its original, source IP address (IP-Host1) to the first intermediary device. The first intermediary device modifies the source IP address (IP-Host1) within the message to a first private IP address (IP-A). The first private IP address (IP-A) may be obtained from the address management logic 180 in response to an address (or address mapping) query message as described below. Through a peer-to-peer communications, such as an encrypted tunnel, the message arrives at the second intermediary device. The second intermediary device then modifies the destination IP address (IP-B) to the source IP address of the second computing device (IP-Host2) and delivers information associated with the message to the second computing device.

To communicate from the second computing device to the first computing device, the second computing device sends a message with a destination address (IP-A) to the second intermediary device (ID2) and a source IP address (IP-Host2). The second intermediary device modifies the source IP address (IP-Host2) of the message to the assigned private IP address from address management logic (IP-B). Via the encrypted tunnel, the message arrives at the first intermediary device. The first intermediary device then modifies the destination IP address (IP-A) to the source IP address of the first computing device (IP-Host1) and delivers information associated with the message to the first computing device.

As another embodiment of the disclosure, in communications from a third computing device, which is not in the overlapped IP address range with the first computing device, the third computing device sends a message with the destination address (IP-A) to the first intermediary device through an encrypted tunnel. Thereafter, the first intermediary device then modifies the destination IP address (IP-A) to the source IP address (IP-Host1) of the first computing device and delivers information associated with the message to the first computing device.

To communicate from the first computing device to the third computing device, the first computing device sends a message with destination IP address (IP-Host3) of the third computing device to the first intermediary device. The first intermediary device modifies the source IP address of the message (IP-Host1) to a private IP address assigned by the address management logic (IP-A) and delivers information associated with the message to the third computing device through standard intermediate routing devices.

I. Terminology

In the following description, certain terminology is used to describe features of the invention. For example, in certain situations, the term "logic" is representative of hardware, firmware, software or a running process that is configured to perform one or more functions. As hardware, logic may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC", etc.), a semiconductor memory, or combinatorial elements.

The logic may be software in the form of one or more software modules, such as executable code in the form of an executable application, an API, a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, a hard disk drive, an optical disc drive, or a portable memory device. As firmware, the executable code may be stored in persistent storage.

The term "computerized" generally represents that any corresponding operations are conducted by hardware in combination with software and/or firmware. A "message" generally represents data for transfer in a structured format, such as at least one packet, frame, asynchronous transfer mode (ATM) cell, or the like. Hence, a message may include a stream of packets being transmitted from a source to a destination.

The term "computing device" should be construed as electronics with data processing or storage capability and/or a capability of connecting to any type of network, such as a public network (e.g., Internet), a private network (e.g., a wireless data telecommunication network, a local area network "LAN", etc.), or a combination of networks. Examples of different types of computing devices may include, but are not limited or restricted to, the following: an endpoint device (e.g., a laptop, a smartphone, a tablet, a desktop computer, a netbook, a medical device, or any user-controlled electronic device); a server; a mainframe; or an intermediary device that facilitates the transfer of data, normally from one network to another network (e.g., router, brouter, bridge, switch, gateway, or any other type of data forwarding device).

The term "interconnect" may be construed as a physical or logical communication path between two or more computing platforms. For instance, the communication path may include wired and/or wireless transmission mediums. Examples of wired and/or wireless transmission mediums may include electrical wiring, optical fiber, cable, bus trace, a radio unit that supports radio frequency (RF) signaling, or any other wired/wireless signal transfer mechanism.

For this disclosure, the term "private IP address" may be construed as an IP address that may not be routable on the Internet. Normally, an IP address that is in the range of 172.16.0.0/12, 192.168.0.0/16 and 10.0.0.0/8 is a private IP address. Additionally, a "virtual private network" (VPC) may be an isolated, non-routable network with a private IP address range. Also, a "private IP address pool" may be a set of unique private IP addresses that is different from the private IP addresses associated with a first network having a first private IP address range and a second network having a second private IP address range. "Address management logic" is a computing device or a group of computing devices that allocate a unique private IP address from the private IP address pool to a computing device in network such as a first network or a second network.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. General Architecture

Figure 1:
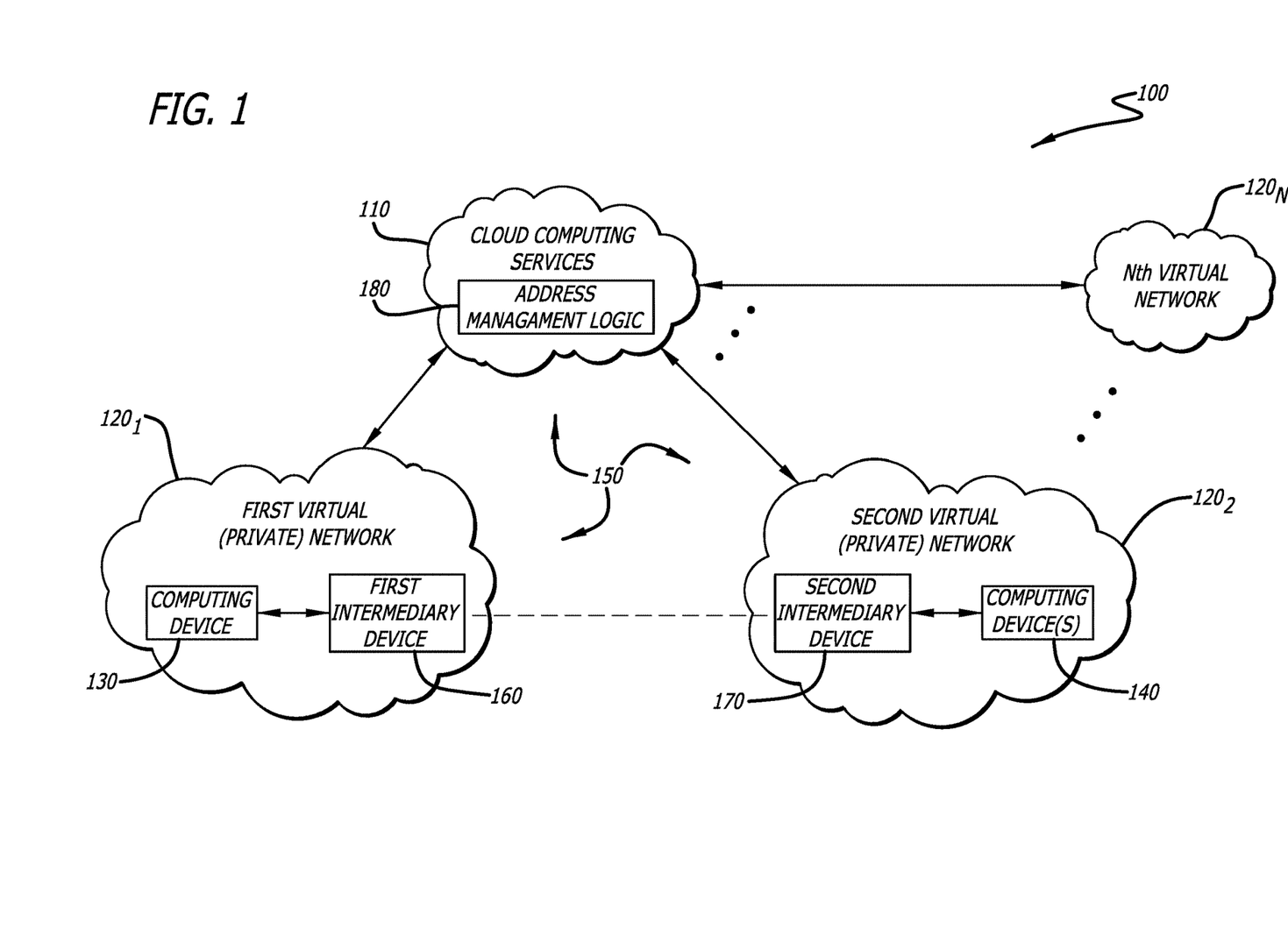
FIG. 1 is an exemplary block diagram of a network architecture with cloud computing services accessible to a plurality of networks that address overlapping private IP address ranges.

Referring to FIG. 1, an exemplary block diagram of a network architecture 100 with cloud computing services 110 accessible to a plurality of networks $120_1$-$120_N$ (N≥1) is shown. Herein, the plurality of networks $120_1$-$120_N$ feature a first network $120_1$ that is geographically separated from a second network $120_2$. As shown, the first network $120_1$ may be a virtual network that includes a computing device 130 with capabilities of accessing the cloud computing services 110 while the second network $120_2$ may be a virtual network including one or more computing devices 140 that has access to the cloud computing services 110. Herein, the cloud computing services 110 may operate as a public cloud, which provides access to hosted resources (e.g., applications, storage, etc.). This allows multiple computing devices from different networks, such as computing devices 130 and 140 for example, to run host applications.

Figure 2A:
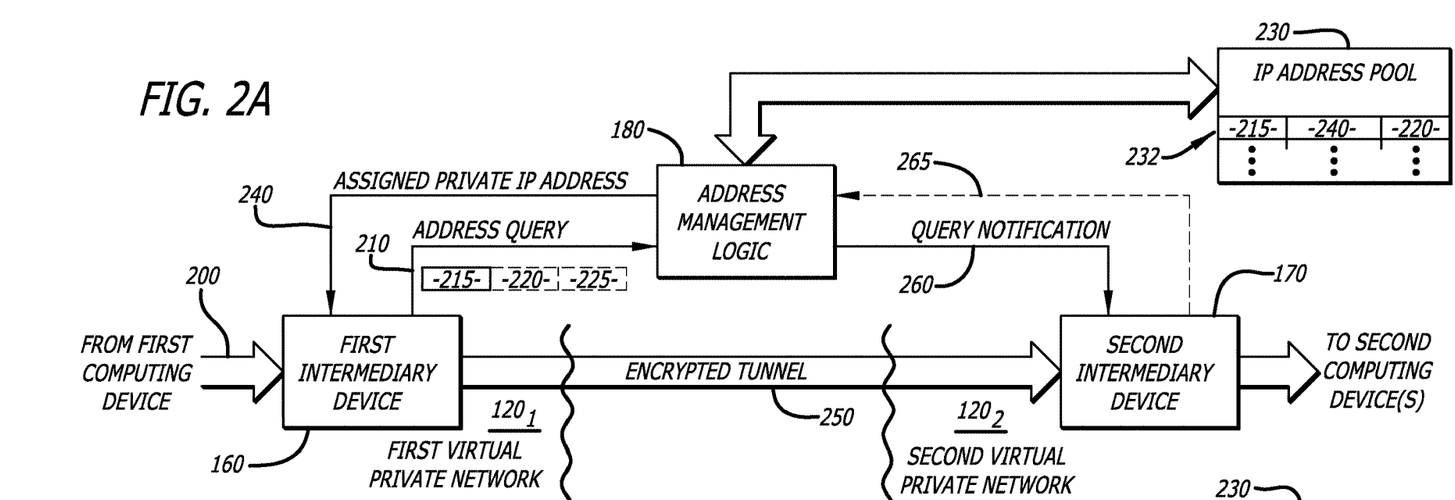
FIG. 2A is a first exemplary embodiment of the inter-communications between the address management logic and the intermediary devices of the IP addressing logic of FIG. 1.
Figure 2B:
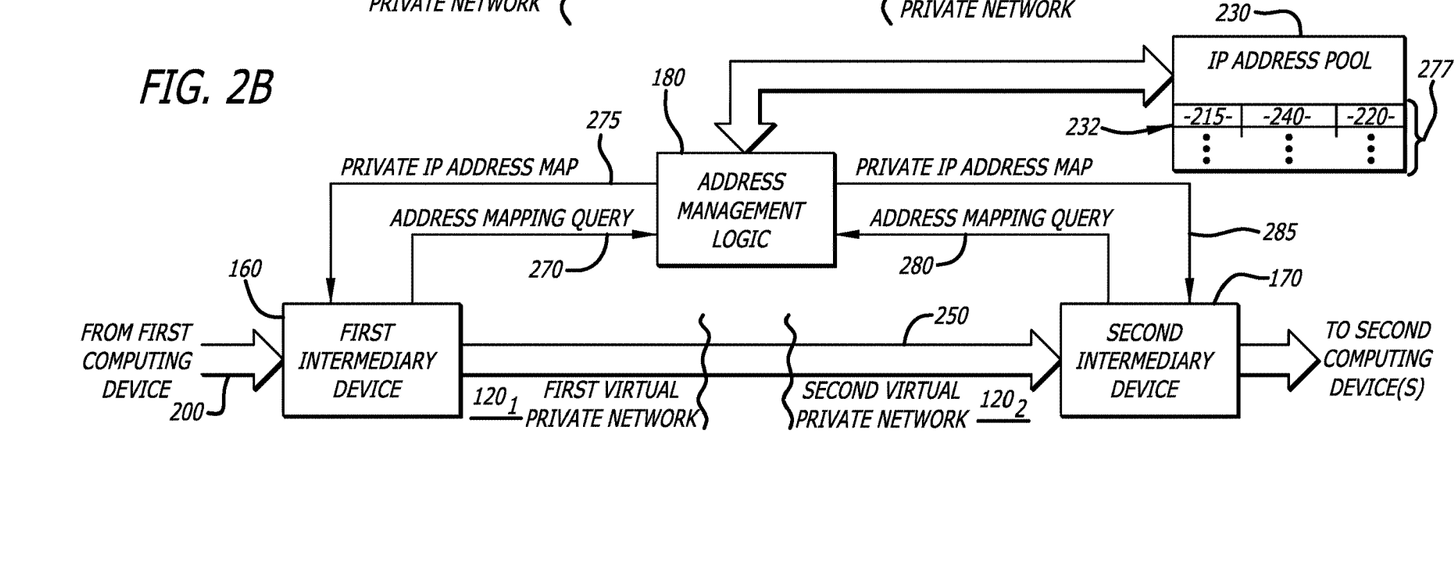
FIG. 2B is a second exemplary embodiment of the inter-communications between the address management logic and the intermediary devices of the IP addressing logic of FIG. 1.

As a public cloud, conventionally, it is not uncommon for the cloud computing services 110 to provide the same default, virtual private cloud (VPC) addresses to different networks. For instance, the first network $120_1$ may be allocated a private IP address range that is identical to, or at least overlaps, the private IP address range allocated to the second network $120_2$. As a result, a computing device in the first network $120_1$ may be unable to communicate with another computing devices in the second network $120_2$ when it is running software instances within the cloud computing services 110. To resolve potential IP address conflicts, IP addressing logic 150 may be implemented as part of the cloud computing services 110, the first network $120_1$ and the second network $120_2$, as illustrated in FIGS. 2A-2B. It is contemplated, however, that IP addressing logic 150 may be implemented to resolve address conflicts for all types of networks with overlapping addresses other than cloud-based networks.

For instance, according to one embodiment of the disclosure, the IP address logic 150 may be deployed, at least in part, as software that is downloaded into a first intermediary device 160, which controls transmission of messages from the first network $120_1$. For instance, the first intermediary device 160 may control transmission of a message from the first network $120_1$ to the second network $120_2$. Similarly, software may be downloaded into a second intermediary device 170, which controls transmission of message from the second network $120_2$, including communications to the first network $120_1$. Examples of different types of intermediary devices may include, but are not limited or restricted to an edge router, a network adapter for a computing device, a firewall, or the like. The downloaded software is configured to provide private IP address resolution functionality by initiating address queries to address management logic 180.

Additionally, the address management logic 180 may be deployed within the cloud computing services 110 or may be deployed within a computing device that is distinct from the cloud computing services 110, such as a third party server for example. The address management logic 180 operates in cooperation with the intermediary devices 160 and 170 to provide private IP address resolution, as needed.

It is contemplated that the IP address logic 150 may be other combinations of hardware, firmware or software to address overlapping, private IP address ranges. For instance, the first intermediary device 160 and/or the second intermediary device 170 may include hardware and/or firmware that is specifically configured to handle private IP address range overlapping. As another embodiment, the address management logic 180 may include such logic. It is contemplated that there exists multiple architectures for handling private IP address overlapping between networks.

Referring now to FIG. 2A, a first exemplary embodiment of the inter-communications between the address management logic 180 and the intermediary devices 160 and 170 is shown. Herein, in response to receipt of a message 200 from the first computing device (not shown) for transmission from the first network $120_1$, the first intermediary device 160 transmits an address query message 210 to the address management logic 180. According to this embodiment of the disclosure, the address query message 210 includes a source IP address 215 for the first computing device from which the message 200 originated. The source IP address 215 may be extracted from the message 200. Optionally, the address query message 210 may further include an identifier 220 for the first network $120_1$ (e.g., service set identifier "SSID", network identifier being certain most significant bits of the IP address, etc.) and/or a destination 225 for the message 200 (e.g., destination IP address). As an alternative embodiment, in lieu of the source IP address 215, the address query message 210 may include the media access control (MAC) address of the first computing device to identify the transmitting computing device.

In response to receiving the address query message 210, the address management logic 180 conducts a lookup of a plurality of private IP addresses (hereinafter generally referred to as an "IP address pool") 230. Herein, the IP address pool 230 comprises a plurality of entries 232 each associated with a particular private IP address. Each entry 232 comprises a unique private IP address (IP-A) 240 that is within the private IP address range supported by the IP address pool 230, along with a source IP address (e.g., source IP address 215) and a network identifier (e.g., network identifier 220) that corresponds to the virtual private network that features the computing device assigned the unique private IP address 240. Based on the lookup, the assigned private IP address 240 from the IP address pool 230 is provided to the first intermediary device 160 for replacement of the source IP address 215 of the first computing device prior to transmission over a peer-to-peer interconnect, such as an encryption tunnel 250 for example, to the second intermediary device 170. The address range of the IP address pool 230 does not overlap the private IP address ranges supported by either the first network $120_1$ or the second network $120_2$. This may be accomplished by reserving a specific private IP address range for the IP address pool 230 for each overlapping IP address range. Alternatively, the assignment may be based "on demand," where the private IP address mapping is established on individual queries as requested.

Furthermore, according to this embodiment, in response to the address query message 210, the address management logic 180 sends a query notification message 260 to the second intermediary device 170. The query notification message 260 may be used to identify that an address query for communications directed to the particular destination 225 has been made, and further may provide a private IP address (IP-B) allocated within the IP address pool 230 for that destination. This may be used to translate the private IP address (IP-B) used as the destination IP address back to the source IP address for the second computing device (IP-Host2). As an optional feature, the query notification message 260 may provide the assigned private IP address (IP-A) 240 to the second intermediary device 170, which may be used to translate the assigned private IP address 240 back to a destination IP address (IP-Host1). Alternatively, an acknowledgement signal 265 to the address management logic 180 or transmission of the query notification message 260 (or one or more address mappings as described in FIG. 2B) may be initiated by the second intermediary device 170.

Referring now to FIG. 2B, a second exemplary embodiment of the inter-communications between the address management logic 180 and the intermediary devices 160 and 170 is shown. Herein, the first intermediary device 160 is configured to transmit an address mapping query message 270 to the address management logic 180 in a periodic or aperiodic manner. For instance, the first intermediary device 160 may transmit the address mapping query message 270 after a prescribed amount of time has elapsed between transmissions (periodic). Alternatively, the first intermediary device 160 may transmit the address mapping query message 270 in response to receipt of the message 200 from the first computing device (not shown) for transmission from the first network $120_1$ (aperiodic).

Similar to the address query message 210 of FIG. 2A, the address mapping query message 270 includes the source IP address for the first computing device and optionally the network identifier and/or destination in efforts to receive one or more private IP address maps, which include one or more private IP addresses associated with a particular network. More specifically, in response to the address mapping query message 270, the address management logic 180 may return one or more private IP address maps 275 from the IP address pool 230. These private IP address maps 275 may include a plurality of entries 277 associated with a particular reserved private IP address range. For instance, one of the private IP address maps may include a plurality of IP addresses, such as the private IP addresses for all computing devices residing in the first network $120_1$. In addition or in the alternative, one of the private IP address maps may include the private IP addresses for multiple networks, such as the first network $120_1$ and the second network $120_2$.

Additionally, the second intermediary device 170 is configured to transmit an address mapping query message 280 to the address management logic 180. For instance, the second intermediary device 170 may transmit the address mapping query message 280 after a prescribed amount of time has elapsed (periodic). Alternatively, however, the second intermediary device 170 may be configured to transmit the address mapping query message 280 in response to receipt of a message 285 via encryption tunnel 250 (aperiodic).

In response to the address mapping query message 280, the address management logic 180 may return one or more private IP address maps 285. For instance, one of the private IP address maps 285 may include a plurality of IP addresses, such as the private IP addresses for all computing devices residing in the second network $120_2$. In addition or in the alternative, one of the private IP address maps 285 may include the private IP addresses for multiple networks, such as the first network $120_1$ and the second network $120_2$.

Figures 3, 4:
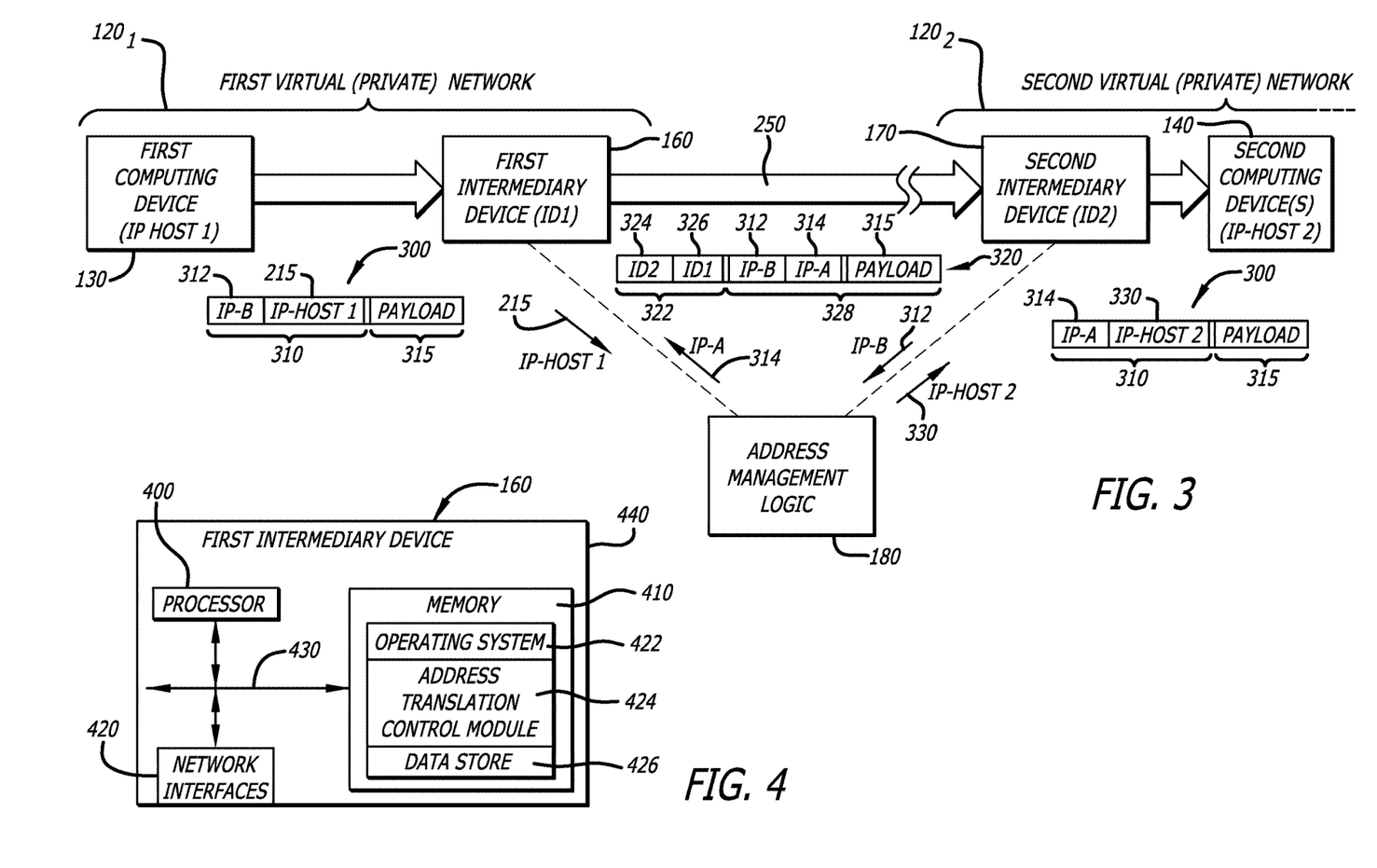
FIG. 3 is an illustrative embodiment of the inter-communications between the first virtual network and the second virtual network in accordance with private IP private address resolution conducted by the IP addressing logic of FIG. 1.
FIG. 4 is an exemplary block diagram of an architecture of an intermediary device.

Referring to FIG. 3, an illustrative embodiment of the inter-communications between the first virtual network $120_1$ and the second virtual network $120_2$ with private IP private address resolution is shown. Herein, a first computing device 130 of the first virtual network $120_1$ has access to, normally from the address management logic 180 of FIGS. 2A-2B, a unique, private IP address (IP-B) that is assigned to a targeted destination of the second virtual network $120_2$ (e.g., second computing device 140). Using the private IP address (IP-B), the first computing device 130 sends a message 300 to the first intermediary device 160 for transmission to one or more of the computing devices within the second virtual network $120_2$, including the second computing device 140. The message 300 includes a header 310 and a payload 315. The header 310 comprises a destination IP address (IP-B) 312 and the source IP address (IP-Host1) 215. The payload 315 includes data for which transmission to the second computing device 140 is sought.

Given that communications are directed from the first network $120_1$ to the second network $120_2$, where such communications are based on operations conducted in combination with cloud computing services for example, the IP address range supported by the first network $120_1$ may overlap the private IP address range supported by the second computing device 140. Hence, before transmission outside the first network $120_1$, the first intermediary device 160 provides at least the source IP address (IP-Host1) 215 from the message 300 to the address management logic 180. The address management logic 180 determines if there is an overlap between the private IP address range associated with the first network $120_1$ and the private IP address range associated with a targeted network (e.g., second network $120_2$). If so, the address management logic 180 returns a unique, non-overlapping private IP address (IP-A) 314 to the first intermediary device 160. Thereafter, the private IP address (IP-A) 314 involved in the communications from the first computing device 130 of the first network $120_1$ is substituted for the source IP address 215, as shown for the message 300 sent from the first intermediary device 160 to another computing device within another network (e.g., the second network $120_2$).

According to this embodiment of the disclosure, contents of the message 300 are encapsulated within a message 320 (hereinafter "encapsulated message 320") for transmission via a peer-to-peer interconnect, such as the encryption tunnel 250 operating in accordance with Internet Protocol Security (IPsec) for example. Herein, a header 322 of the encapsulated message 320 includes a destination address (ID2) 324 associated with the second intermediary device 170 and a source address (ID1) 326 associated with the first intermediary device 160. The payload 328 of the encapsulated message includes information within the message 300, including IP-B 312, IP-A 314 and payload 315.

Upon receipt of the encapsulated message 320, the second intermediary device 170 extracts at least a portion of the payload 328, such as IP-B 312, IP-A 314 and payload 315. Thereafter, the second intermediary device 170 is configured to conduct a private IP address translation on IP-A 314 to recover the source IP address (IP-Host1) 215. Additionally, the second intermediary device 170 is configured to conduct a private IP address translation on IP-B 312 to recover the source IP address (IP-Host2) for the second computing device 140 within the second virtual network $120_2$.

Referring now to FIG. 4, an exemplary block diagram of an architecture of one of the intermediary devices, such as the first intermediary device 160, is shown. Herein, the first intermediary device 160 illustratively includes at least one hardware processor 400, a memory 410, one or more network interfaces (referred to as "network interface(s)") 420, which are communicatively coupled via an interconnect 430, such as a bus. This collection of logic may be at least partially encased in a housing 430, which is made entirely or partially of a rigid material (e.g., hardened plastic, metal, glass, composite, or any combination thereof) that protects the logic from atmospheric conditions.

The hardware processor 400 is a multipurpose, programmable device that accepts digital data as input, processes the input data according to instructions stored in its memory 410, and provides results as output. One example of the hardware processor 400 may include an Intel® x86 central processing unit (CPU) with an instruction set architecture. Alternatively, the hardware processor 400 may include another type of CPU, a digital signal processor (DSP), an application specific integrated circuit (ASIC), or the like.

According to one implementation, the network interface(s) 420 may include one or more network ports containing the mechanical, electrical and/or signaling circuitry needed to connect the first intermediary device 160 to the first network $120_1$ to thereby facilitate communications between multiple networks. To that end, the network interface(s) 420 may be configured to transmit and/or receive messages using a variety of communication protocols including, inter alia, TCP/TP and HTTPS.

The memory 410 may include a plurality of locations that are addressable by the hardware processor 400 and the network interface(s) 420 for storing software (including software applications) and data structures associated with such software. Examples of the stored software include an operating system (OS) 422, address translation control module 424 and a data store 426, The address translation control module 424 is software that controls the signaling between the address management logic 180 of FIGS. 2A-2B in order to control substitution of the source private IP address with a corresponding, uniquely assigned private IP address. Furthermore, the data store 426 is configured to store one or more source IP address-to-private IP address translations, such as the private IP address mapping 275 as shown in FIG. 2B.

Figure 5:
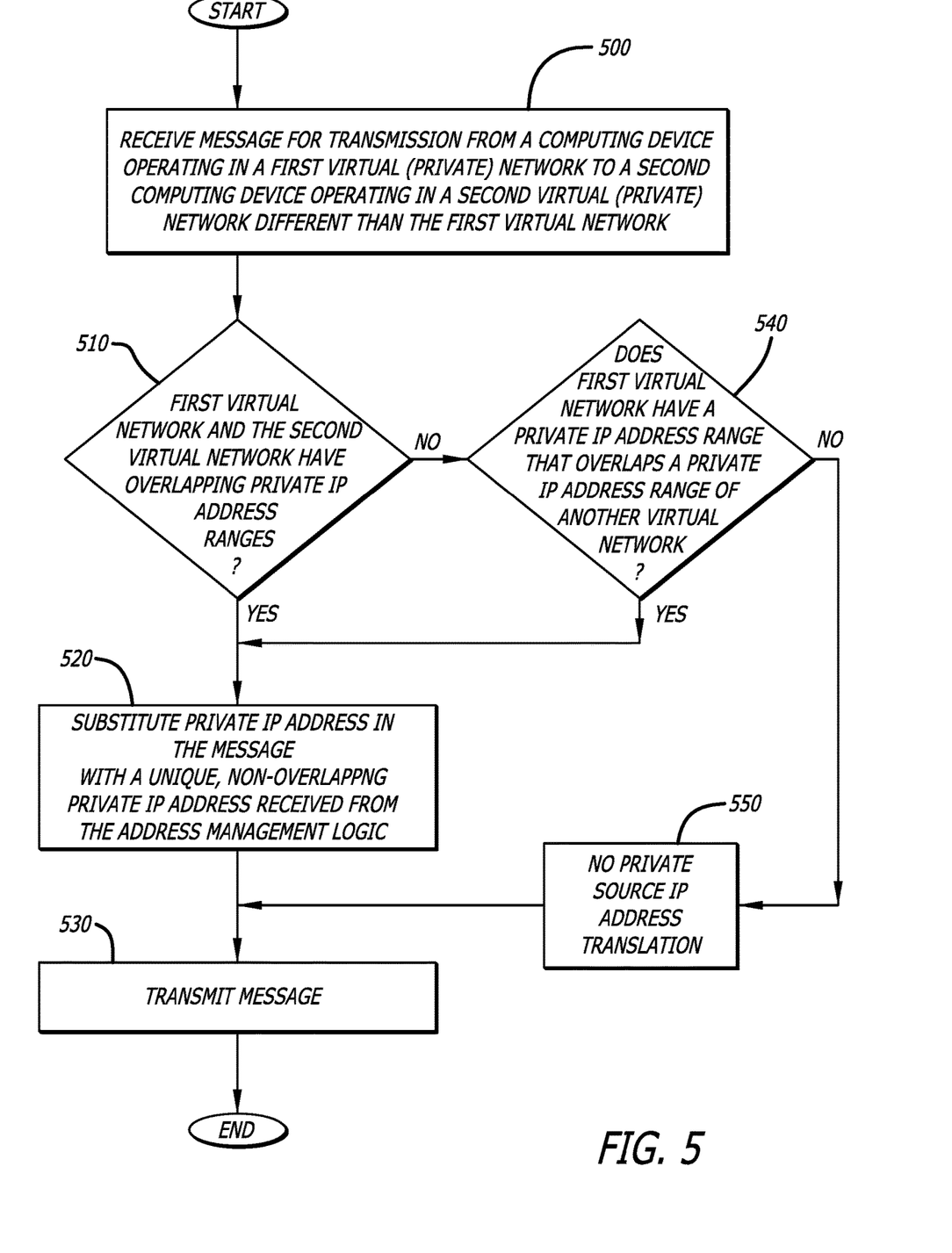
FIG. 5 is an exemplary flowchart of the operations conducted by any of the intermediary devices of FIG. 1.

Referring to FIG. 5, a flowchart of the operations conducted by an intermediary device are shown, where the intermediary device controls potential private IP address conflict resolution based on communications between a first computing device within a first virtual (private) network and a second computing device within a second virtual (private) network. The private IP address range of the second virtual network at least overlaps the private IP address range of the first virtual network. Herein, the intermediary device receives a message from a computing device that is to be transmitted outside a computing device within a second virtual (private) network that is outside the first virtual network (block 500). In response to the first virtual network and the second virtual network being determined to have overlapping private IP address ranges, the intermediary device translates the source IP address within the message into a unique, private IP address (e.g., 192.168.0.x/16), which is a different private IP address range than the source IP address (e.g., 10.0.0.x/8), as illustrated in blocks 510 and 520. Thereafter, the message with the unique, private IP address is transmitted to the second virtual network (block 530).

Additionally, in response to the first virtual network and the second virtual network being associated with non-overlapping private IP address ranges, as an optional feature, the intermediary device may still conduct a translation of the source IP address within the message into a unique, private IP address, especially where predetermined regions of the IP address pool are allocated for each virtual (private) network (blocks 540 and 520). However, the source IP address for messages from the second virtual network to the first virtual network will not undergo a private IP address translation, as described.

Where the first virtual network has no overlapping private IP address ranges with another virtual network, no private IP address translations conducted on the source IP address is conducted (block 550).

In the foregoing description, the invention is described with reference to specific exemplary embodiments thereof. It will, however, be evident that various modifications and changes may be made thereto without departing from the broader spirit and scope of the invention.

What is claimed is:

1. A computerized method for enabling communications between networks with overlapping Internet Protocol (IP) address ranges, the computerized method comprising:
  receiving a first address mapping query message from a first intermediary device associated with a first network, the first address mapping query message includes a source IP address and a network identifier;
  transmitting a first private IP address map in response to the first address mapping query message to the first intermediary device, the first private IP address map including at least a first plurality of private IP addresses each uniquely assigned to a computing device residing in the first network;
  in response to a triggering event detected by a second intermediary device associated with a second network, receiving a second address mapping query message;
  transmitting a second private IP address map in response to the second address mapping query message, the second private IP address map including at least a second plurality of private IP addresses each uniquely assigned to a computing device residing in the second network;
  substituting the source IP address for a private IP address associated with the computing device prior to transmission of a message from the first intermediary device to the second intermediary device upon determining that the first network and the second network include overlapping private IP address ranges; and
  retaining the source IP address within the message being transmitted from the first intermediary device to the second intermediary device in response to the first network and the second network including non-overlapping private IP address ranges.

2. The computerized method of claim 1, wherein the private IP address is outside an IP address range allocated to the first network.

3. The computerized method of claim 1, wherein the first network is a first virtual private network and the second network is a second virtual private network.

4. The computerized method of claim 1, wherein the first intermediary device and the second intermediary device correspond to a first gateway and a second gateway.

5. A device operating within a first virtual private network that controls transmissions to a second virtual private network, the device comprising:
 processing logic; and
 a non-transitory storage medium including information accessed by the processing logic, the non-transitory storage medium comprises an address translation control module and a data store,
 wherein the address translation control module being software that, when executed, controls a substitution of a first private IP address, included in a first message received from a first computing device residing within the first virtual private network for transmission to a second computing device residing within the second virtual private network, with a second private IP address outside a private IP address range allocated to the first virtual private network by at least
  (i) sending a first address mapping query message includes a source IP address and a network identifier,
  (ii) receiving a first private IP address map in response to the first address mapping query message, the first private IP address map including at least a first plurality of private IP addresses each uniquely assigned to a computing device residing in the first network,
  (iii) responsive to determining that the first network and the second network including overlapping private IP address ranges, (a) substituting a first private IP address from the first private IP address map within the first message with a second private IP address being a selected unique, non-overlapping private IP address, the non-overlapping private IP address being outside an IP address range allocated to the first network, and transmitting the first message to the second computing device,
 wherein the address translation control module being further configured, in response to determining that the first network and the second network including non-overlapping private IP address ranges, permitting a transmission of the first message including the source IP address.

6. The computing device of claim 5, wherein the processing logic corresponding to one or more hardware processors.

7. The computing device of claim 5, wherein the first network corresponds to a first virtual private network and the second network corresponds to a second virtual private network.

8. The computing device of claim 7, wherein the second private IP address is a unique private IP address outside at least the private IP address range allocated to the first virtual private network.

9. The computing device of claim 7, wherein the second private IP address is a unique private IP address outside the private IP address range allocated to the first virtual private network and a private IP address range allocated to the second virtual private network.

10. A computerized method for enabling communications between networks with overlapping Internet Protocol (IP) address ranges, the computerized method comprising:
 receiving a first query message from a first software instance operating on a first computing device associated with a first network, the first query message includes a source IP address and a network identifier;
 transmitting a first message in response to the first query message, the first message including at least a first plurality of private IP addresses each uniquely assigned to a computing device residing in the first network;
 in response to a triggering event detected by a second software instance operating within a second computing device associated with a second network, receiving a second query message;
 transmitting a second message in response to the second query message, the second message including at least a second plurality of private IP addresses each uniquely assigned to a computing device residing in the second network;
 substituting the source IP address for a private IP address associated with the first computing device upon determining that the first network and the second network include overlapping private IP address ranges; and
 retaining the source IP address within the message being transmitted from the first software instance to the second software instance in response to the first network and the second network including non-overlapping private IP address ranges.

11. The computerized method of claim 10, wherein the private IP address is outside an IP address range allocated to the first network.

12. The computerized method of claim 10, wherein the first network is a first virtual private network and the second network is a second virtual private network.

13. The computerized method of claim 10, wherein the first computing device and the second computing device correspond to a first gateway and a second gateway with a selected private IP address provided by the address management logic.

* * * * *